Nov. 13, 1945.   P. M. BROWN   2,389,023
FRAME FOR EYEGLASSES
Filed Jan. 6, 1942
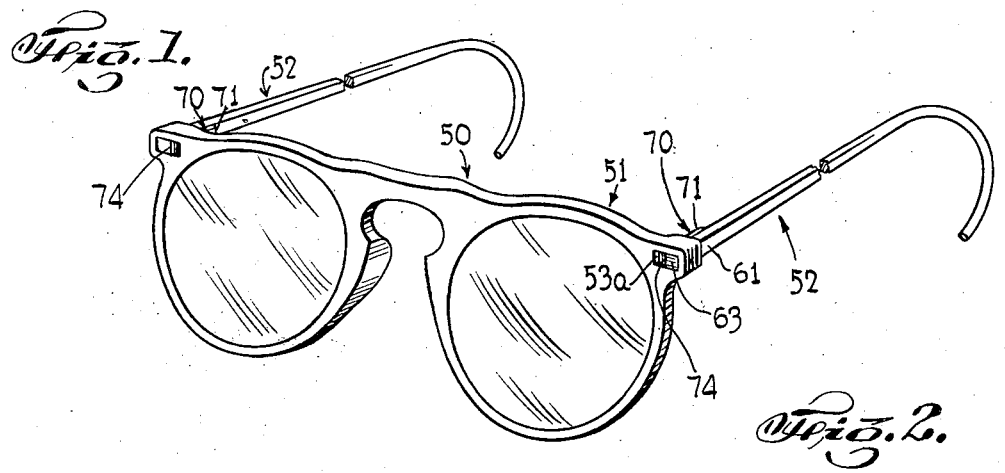
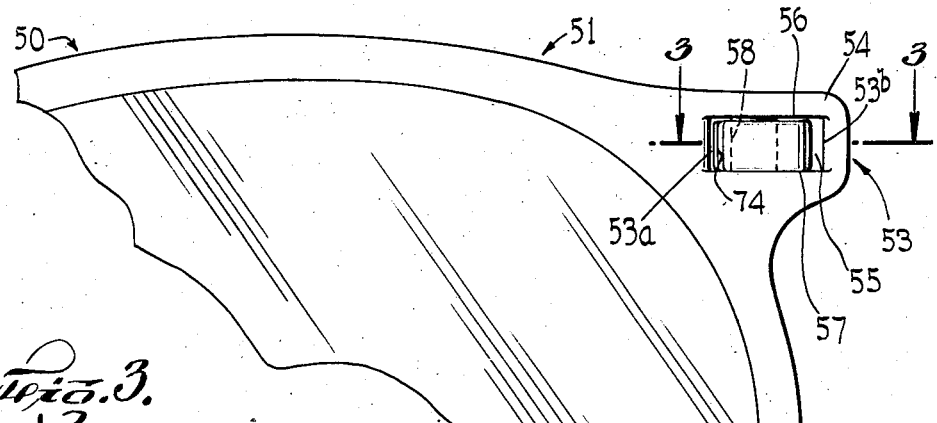
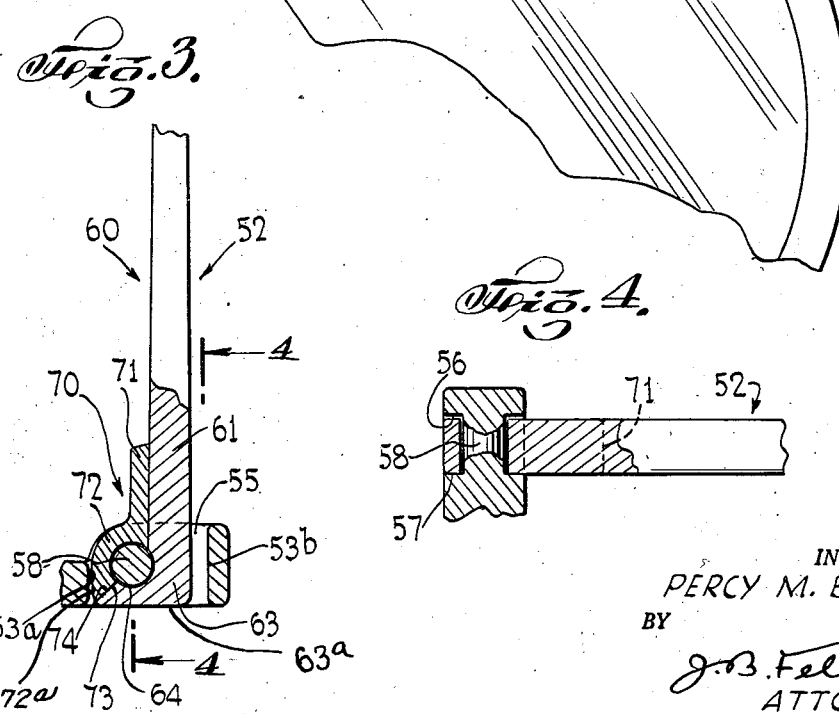
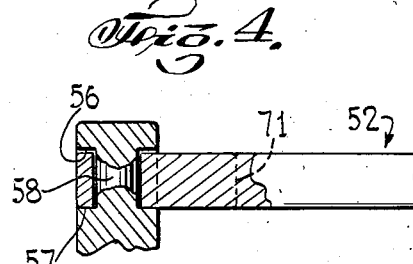
INVENTOR.
PERCY M. BROWN
BY
J. B. Felshin
ATTORNEY Patented Nov. 13, 1945

2,389,023

UNITED STATES PATENT OFFICE 2,389,023

FRAME FOR EYEGLASSES

Percy M. Brown, East Orange, N. J., assignor, by mesne assignments, to Designs, Incorporated, Hoboken, N. J., a corporation of New Jersey Application January 6, 1942, Serial No. 425,708

5 Claims. (Cl. 88—53)

This invention relates to frame for eyeglasses.

An object of this invention is to provide a frame for eyeglasses, in which the hinges for the temple pieces are made of plastic material, thus eliminating metal parts.

A further object of this invention is to provide an improved, strong and durable frame for eyeglasses, of the character described, which shall be relatively inexpensive to manufacture, easy to assemble, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of eyeglasses embodying the invention provided with hinges for the temple pieces;

Fig. 2 is an enlarged, front elevational view of a portion of the glasses;

Fig. 3 is a cross-sectional view taken on line 3—3 of Fig. 2; and

Fig. 4 is a cross-sectional view taken on line 4—4 of Fig. 3.

In Figs. 1, 2, 3 and 4 there is disclosed a pair of eyeglasses 50 comprising a frame 51 made of plastic material and a pair of temple pieces 52 likewise made of plastic material. As will be described hereinafter the temple pieces 52 are connected to the frame 51 by hinges 53 made of plastic material and eliminating the usual metal hinges to effect a saving in metal.

To this end, the frame 51 is formed at its opposite ends with a pair of integrally molded, similar, symmetrically disposed ears 54, each formed with a substantially rectangular through opening 55, having parallel top and bottom surfaces 56 and 57, and parallel vertical surfaces 53a and 53b. Interconnecting said surfaces 56 and 57 of each opening 55 is a vertical shaft 58 preferably integrally molded with the ear 54 and spaced from surfaces 53a, 53b. The shaft 58 is preferably somewhat closer to surface 53a than to surface 53b.

It will be noted that the ears 54 are thickened rearwardly, and shafts 58 project rearwardly of the body frame to permit the temple pieces to be swung inwardly.

Each of the temple pieces 52 comprises a member 60 having a shank portion 61 made of plastic material, and provided with the usual ear engaging hook at its rear end. The shank 61, has at its forward end, a portion 63 projecting into the opening 55, and formed with a semi-cylindrical surface 64, half surrounding the shaft 58.

Attached to the inner side of the forward end of shank 61, is a piece 70, likewise made of plastic material, and having a portion 71 contacting the inner surface of said shank, and a semi-cylindrical portion 72, likewise surrounding half of the shaft 58. Portion 72 is complementary to portion 63. Said portion 72 furthermore has an end edge 74 contacting an underedge 73 of the portion 63 on the shank 61. The meeting surfaces 73, 74 are cemented together, and the meeting surfaces of portion 71 of member 70 and portion 63 of shank 61, are likewise cemented together, thus forming a bearing for the shaft 58.

It will be noted that the forward end of shank 61 is squared to substantially fill the opening 55, enough clearance being provided however, to permit the temple piece to be swung inwardly. At its forward end shank 61 has a surface 63a, substantially perpendicular to the longitudinal axis of the shank, and disposed in the plane of the front of the frame.

Furthermore, portion 72 of member 70 has a flat inner surface 72a which contacts surface 53a, when the temple piece is swung outwardly in position for use, thereby to limit outward swinging movement of the temple piece relative to the body. The meeting surfaces 73 and 74 extend radially of the axis of shaft 58, as shown in Fig. 3 of the drawing. The surface 74 extends to the forward end of surface 72a, and surface 73 extends to the inner end of surface 63a. With such construction, the meeting surfaces 73, 74 are enlarged to permit a good adherence between members 60 and 70.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A frame for eyeglasses having similar, symmetrically disposed ears at opposite ends thereof, formed with substantially rectangular through openings, each opening having top and bottom surfaces and vertical end surfaces, a vertical shaft interconnecting the top and bottom surfaces of each opening, a temple piece for each ear, each temple piece comprising a shank having a portion projecting into said opening, and formed with a part-cylindrical surface surrounding part of said shaft, and a piece having a complementary part-cylindrical surface, said piece and shank having meeting surfaces on opposite sides of said shaft, and means to adhere said meeting surfaces, each shank having at its forward end a surface substantially perpendicular to the longitudinal axis of said shank, and substantially in the plane of the front of said frame.

2. A frame for eyeglasses having similar, symmetrically disposed ears at opposite ends thereof, formed with substantially rectangular through openings, each opening having top and bottom surfaces and vertical end surfaces, a vertical shaft interconnecting the top and bottom surfaces of each opening, a temple piece for each ear, each temple piece comprising a shank having a portion projecting into said opening, and formed with a part-cylindrical surface surrounding part of said shaft, and a piece having a complementary part-cylindrical surface, said piece and shank having meeting surfaces on opposite sides of said shaft, and means to adhere said meeting surfaces, each shank having at its forward end a surface substantially perpendicular to the longitudinal axis of said shank, and substantially in the plane of the front of said frame, each piece having a surface adapted to contact the inner surface of one of said openings when the temple piece is in position for use.

3. A frame for eyeglasses having similar, symmetrically disposed ears at opposite ends thereof, formed with substantially rectangular through openings, each opening having top and bottom surfaces and vertical end surfaces, a vertical shaft interconnecting the top and bottom surfaces of each opening, a temple piece for each ear, each temple piece comprising a shank having a portion projecting into said opening, and formed with a part-cylindrical surface surrounding part of said shaft, and a piece having a complementary part-cylindrical surface, said piece and shank having meeting surfaces on opposite sides of said shaft, and means to adhere said meeting surfaces, each shank having at its forward end a surface substantially perpendicular to the longitudinal axis of said shank, and substantially in the plane of the front of said frame, each piece having a surface adapted to contact the inner surface of one of said openings when the temple piece is in position for use, said frame and temple pieces being made of plastic material.

4. A frame for eyeglasses having similar symmetrically disposed ears at opposite ends thereof formed with rectangular through openings, each opening having top and bottom surfaces and vertical end surfaces, a vertical shaft interconnecting the top and bottom surfaces of each opening, a temple piece for each ear, each temple piece comprising a shank having a hinge portion projecting into the opening of one of the ears, and formed with a bearing opening receiving the shaft in said through opening, each shank having at its forward end a surface substantially perpendicular to the longitudinal axis of said shank, and substantially in the plane of the front of said frame.

5. A frame for eyeglasses having similar symmetrically disposed ears at opposite ends thereof formed with rectangular through openings, each opening having top and bottom surfaces and vertical end surfaces, a vertical shaft interconnecting the top and bottom surfaces of each opening, a temple piece for each ear, each temple piece comprising a shank having a hinge portion projecting into the opening of one of the ears, and formed with a bearing opening receiving the shaft in said through opening, each shank having at its forward end a surface substantially perpendicular to the longitudinal axis of said shank, and substantially in the plane of the front of said frame, the hinge portion of each temple piece having a surface adapted to contact the inner surface of one of said through openings when the temple piece is in position for use.

PERCY M. BROWN.